US012789781B2

(12) United States Patent
Macchi et al.

(10) Patent No.: US 12,789,781 B2
(45) Date of Patent: Nov. 10, 2026

(54) METHOD AND DEVICE FOR ESTIMATING THE BRAKING ACTIVATION OF A VEHICLE

(71) Applicant: ITT Italia S.R.L., Lainate (IT)

(72) Inventors: Pietro Macchi, Turin (IT); Stefano Serra, Saluzzo (IT); Umberto Vignolo, Porte (IT)

(73) Assignee: ITT Italia S.r.l., Lainate (IT)

( * ) Notice: Subject to any disclaimer, the term of this patent is extended or adjusted under 35 U.S.C. 154(b) by 0 days.

(21) Appl. No.: 19/144,423

(22) PCT Filed: Dec. 18, 2023

(86) PCT No.: PCT/EP2023/086362

§ 371 (c)(1),
(2) Date: Jun. 27, 2025

(87) PCT Pub. No.: WO2024/141305

PCT Pub. Date: Jul. 4, 2024

(65) Prior Publication Data

US 2026/0208717 A1 Jul. 23, 2026

(30) Foreign Application Priority Data

Dec. 30, 2022 (IT) ........................ 102022000027372

(51) Int. Cl.

| | |
|---|---|
| ***B60T 17/22*** | (2006.01) |
| ***B60T 8/171*** | (2006.01) |
| ***F16D 66/00*** | (2006.01) |

(52) U.S. Cl.

CPC .............. *B60T 17/22* (2013.01); *B60T 8/171* (2013.01); *F16D 66/00* (2013.01);
(Continued)

(58) Field of Classification Search

CPC ........ B60T 17/22; B60T 8/11; B60T 2210/32; B60T 2240/00; B60T 2250/04;
(Continued)

(56) References Cited

U.S. PATENT DOCUMENTS

2014/0311833 A1* 10/2014 Martinotto ............ F16D 65/092 29/25.35
2022/0381631 A1* 12/2022 Macchi .................... B60T 17/00

FOREIGN PATENT DOCUMENTS

DE 102006018952 A1 * 10/2007 ............. F16D 65/18
EP 3297881 A1 * 3/2018 .............. B60T 8/175
EP 3297881 B1 8/2020

OTHER PUBLICATIONS

International Search Report issued in application No. PCT/EP2023/086362 on Mar. 15, 2024.

* cited by examiner

*Primary Examiner* — Abdulmajeed Aziz
(74) *Attorney, Agent, or Firm* — VIA LLP

(57) ABSTRACT

A method for estimating the activation of the braking of a vehicle, comprising at least one braking element (3, 3') and at least one braked element (2) of at least one brake (1) of a vehicle, in which the braking element (3, 3') includes at least one force sensor (6), and at least one electronic control unit (11) of the at least one brake (1), comprises the steps of: temporal acquisition by the control unit (11) of at least one force signal generated by the at least one force sensor (6); detection of significant temporal changes of the force signal; processing in the control unit (11) with a customized algorithm of the significant changes of the force signal; reconstruction through the algorithm of temporal moments of activation and release of the braking; return by the control unit (11) of the temporal moments of activation and release of the braking to information systems (19) and/or board
(Continued)

control applications (20) and/or to algorithms (21) dedicated to estimating the performance and conditions of the braking system of said vehicle.

16 Claims, 8 Drawing Sheets

(52) U.S. Cl.
CPC ....... *B60T 2210/32* (2013.01); *B60T 2240/00* (2013.01); *B60T 2250/04* (2013.01); *B60T 2270/406* (2013.01); *F16D 2066/001* (2013.01); *F16D 2066/003* (2013.01); *F16D 2066/005* (2013.01); *F16D 2066/006* (2013.01)

(58) Field of Classification Search
CPC .............. B60T 2270/406; F16D 66/00; F16D 2066/001; F16D 2066/003; F16D 2066/005; F16D 2066/006
See application file for complete search history.

METHOD AND DEVICE FOR ESTIMATING THE BRAKING ACTIVATION OF A VEHICLE

The following invention relates to a device and method for estimating braking activation in a vehicle.

SUMMARY

As is well known, the evaluation, estimation and recording of a vehicle's braking activation can be an important component in the evaluation, estimation and recording of characteristic braking events that make up more complex vehicle monitoring activities through known smart brake pad technologies.

The traditional evaluation includes elements that detect the position of the brake pedal under the action of the driver's foot, from which directly or through various types of algorithms they trace the required braking characteristics, and the downstream characteristics of the components of the braking system, typically pressure variations in the hydraulic lines, stresses on the pedal, reactivity of the braking system, braking effectiveness, speed variations, etc.

In an increasingly complex regulatory system, technical features typically ancillary to sophisticated systems for monitoring a vehicle, and in particular its braking system, are also of particular importance.

In this scenario, the control and monitoring of any characteristics that may limit the efficiency of the braking system and its possible loss of performance becomes increasingly important.

Advanced Driver Assistance Systems (ADAS) are also known to autonomously assess and intervene during braking, typically in emergencies, in which the control and implementation of braking exceeds the physical movement of the brake pedal.

Traditional evaluation of braking activation through simple detection of the brake pedal position can be slow, inaccurate and ineffective compared to the information needs of the more sophisticated systems known to detect and monitor braking characteristics.

The task proposed by the present invention is to overcome the above-mentioned limitations of the known technique.

Within the scope of this task, it is an aim of the invention to devise a method and a device that allows an estimation of braking activation in a vehicle independent of a signal detected by the brake pedal.

It is also the aim of the invention to devise a method and device that allows an estimation of braking activation in a vehicle at each brake pad.

It is still the aim of the invention to devise a method and device that allows an estimation of braking activation in a vehicle in real time.

Last but not least, the aim of the invention is to devise a device and method for estimating braking activation in a vehicle by means compatible with on-board installations and applications.

Last but not least, the aim of the invention is to devise a device and method for estimating braking activation in a vehicle by means compatible with on-board installations and applications connected to remotely located recording and processing means.

This task as well as these and other purposes are achieved by a method for estimating the activation of the braking of a vehicle, comprising at least one braking element and at least one braked element of at least one brake of a vehicle, in which the braking element includes at least one force sensor, and at least one electronic control unit of said at least one brake, characterized in that it comprises the steps of:

- temporal acquisition by said control unit of at least one force signal generated by said at least one force sensor;
- detection of significant temporal changes of said force signal;
- processing in said control unit with a customized algorithm of said significant changes of said force signal;
- reconstruction through said algorithm of temporal moments of activation and release of the braking;
- return by said control unit of said temporal moments of activation and release of the braking to information systems and/or board control applications and/or to algorithms dedicated to estimating the performance and conditions of the braking system of said vehicle.

The present invention also discloses a device for estimating the activation of the braking of a vehicle, comprising at least one braking element and at least one braked element of at least one brake of a vehicle in which the braking element includes at least one force sensor, and at least one control unit, in which said control unit acquires over time a force signal generated by said at least one force sensor, detects significant temporal changes of said force signal, processes with a customized algorithm said significant changes of said force signal, reconstructs through said algorithm temporal moments of activation and release of the braking, returns said temporal moments of activation and release of the braking to information systems and/or on-board control applications and/or to algorithms dedicated to estimating the performance and conditions of the braking system of said vehicle.

BRIEF DESCRIPTION OF THE DRAWINGS

Various forms of implementation are depicted in the attached drawings for illustrative purposes and should in no way be construed as limiting the scope of this illustration.

Various characteristics of different disclosed forms of realisation can be combined to form additional forms of realisation, which are part of this illustration.

DETAILED DESCRIPTION OF SOME FORMS OF REALISATION

In the following detailed description, reference is made to the attached drawings, which form a part of this description.

In drawings, similar reference numbers typically identify similar components, unless the context dictates otherwise.

The preferred forms of execution described in the detailed description and drawings are not intended to be limiting.

Typically, components relating to only one corner of the vehicle are illustrated.

Other forms of realisation can be used and other changes can be made without departing from the spirit or scope of the topic presented here.

The aspects of this illustration, as broadly described herein and illustrated in the figures, can be arranged, substituted, combined, separated and designed in a wide variety of different configurations, all of which are explicitly contemplated and present in this illustration.

Figure 1:
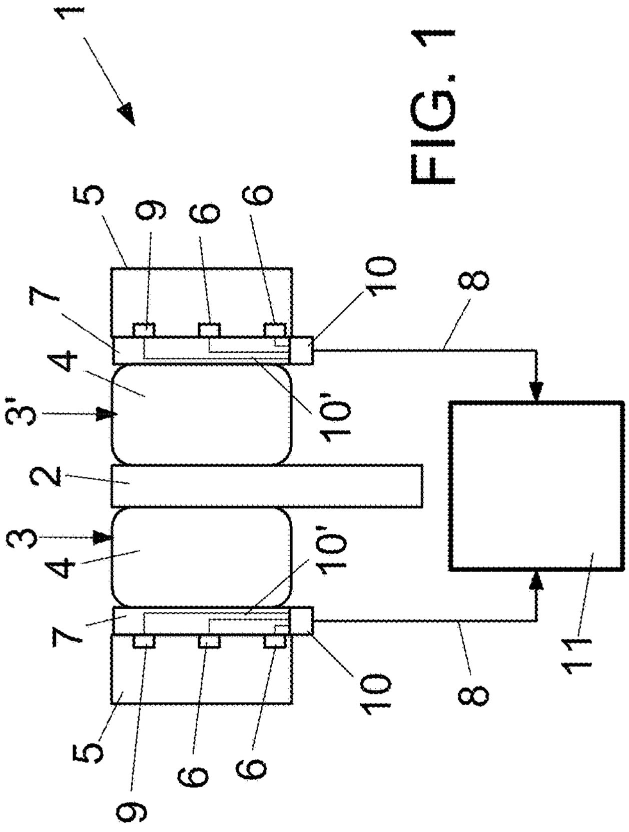
FIG. 1 shows schematically a corner of a vehicle properly configured to estimate the braking activation of a vehicle conforming to a first embodiment of the invention.

According to the present invention, as illustrated schematically in FIG. 1, at least one corner of the vehicle is duly equipped with a brake 1 comprising a braked element 2 and at least one braking element 3 and at least one braking element 3', in particular two braking elements 3 and 3'.

Each braking element 3, 3' includes a wearable block of friction material 4 and a rear support plate 5, typically metallic, between which is interposed at least one force sensor 6, typically but not limited to piezoceramic type.

A cushioning layer 7 can be provided between the rear support plate 5 and the friction material block 4.

Brake 1 can be either a drum brake or a disc brake with pads.

In the case illustrated below, we will refer to a disc brake 1 with pads in which the braked element 2 is a disc and the two braking elements 3, 3' are operative on opposite sides of the disc and consist of a right-hand and a left-hand pad of which at least one is sensed with at least one force sensor 6. In the case of a drum brake, which is not illustrated, there will be a drum as the braked element and two brake shoes as the braking elements, at least one of which will be sensorised with at least one force sensor.

Preferably the braking element 3, 3' includes more than one force sensor 6, in particular at least one normal force sensor and/or at least one shear force sensor.

The force sensors 6 are connected to an electrically isolated circuit 8 located on the side of the rear support plate 5 facing the friction material block 4.

The braking element 3, 3' advantageously can also include at least one temperature sensor 9 connected to the electrical circuit 8.

Temperature sensor 9 is configured and positioned to preferably acquire the temperature of the rear support plate 5.

Electrical circuit 8 has electrical tracks 10' connecting force sensor 6 and temperature sensor 9 to an electrical interface connector 10 for the transmission of electrical signals generated by force sensor 6 and temperature sensor 9 to an electronic control unit 11 of brake 1.

Advantageously, one or more corners can thus be equipped in a vehicle.

Advantageously, the electronic control units 11 for braking activation estimation may be one or more individually dedicated to each corner of the vehicle, or a single higher electronic control unit 11 for braking activation estimation of several corners of the vehicle.

Figure 2:
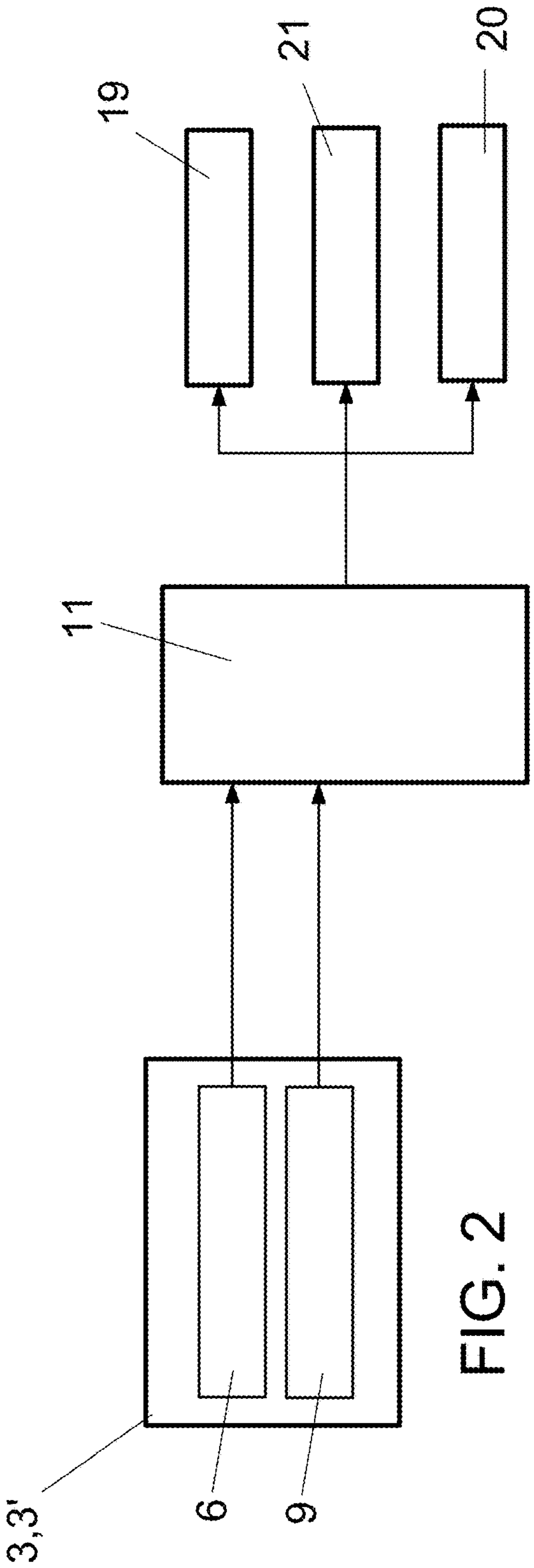
FIG. 2 shows an architecture of a device for estimating braking activation, in accordance with a first embodiment of the invention.

In a first embodiment, shown schematically in FIG. 2, the electronic control unit 11 only receives the electrical signals generated by the force sensor 6 and temperature sensor 9.

Normal force and shear force can be measured using a single force sensor or by a set of sensors distributed on the braking element 3, 3', and can be used together or alternatively by the electronic control unit 11 for reconstructing the time moments of brake application and release.

The temperature measured by temperature sensor 9 and acquired by electronic control unit 11 is used for compensation purposes to improve the performance of a calculation algorithm in control unit 11 for estimating the braking activation of a vehicle.

The control unit 11 uses a customised algorithm to process the detected changes in force signals, and reconstructs through the algorithm the temporal moments of braking activation and release, which it returns to information systems 19 and/or control applications 20 on board the vehicle.

Advantageously, the electronic control unit 11 of the brake 1 may interact with other sensors 100 installed in the vehicle comprising sensors, means of measuring and/or estimating physical parameters representative of the status of the brake and/or the vehicle.

Such sensors 100 may include, by way of example but not limitation, a vehicle speed sensor 14, a vehicle acceleration sensor 15, a temperature sensor 16 for the environment outside the vehicle, a temperature sensor 17 for the temperature of the braked element 2, and a speed and/or angular acceleration sensor 18 for the vehicle wheel.

Figure 3:
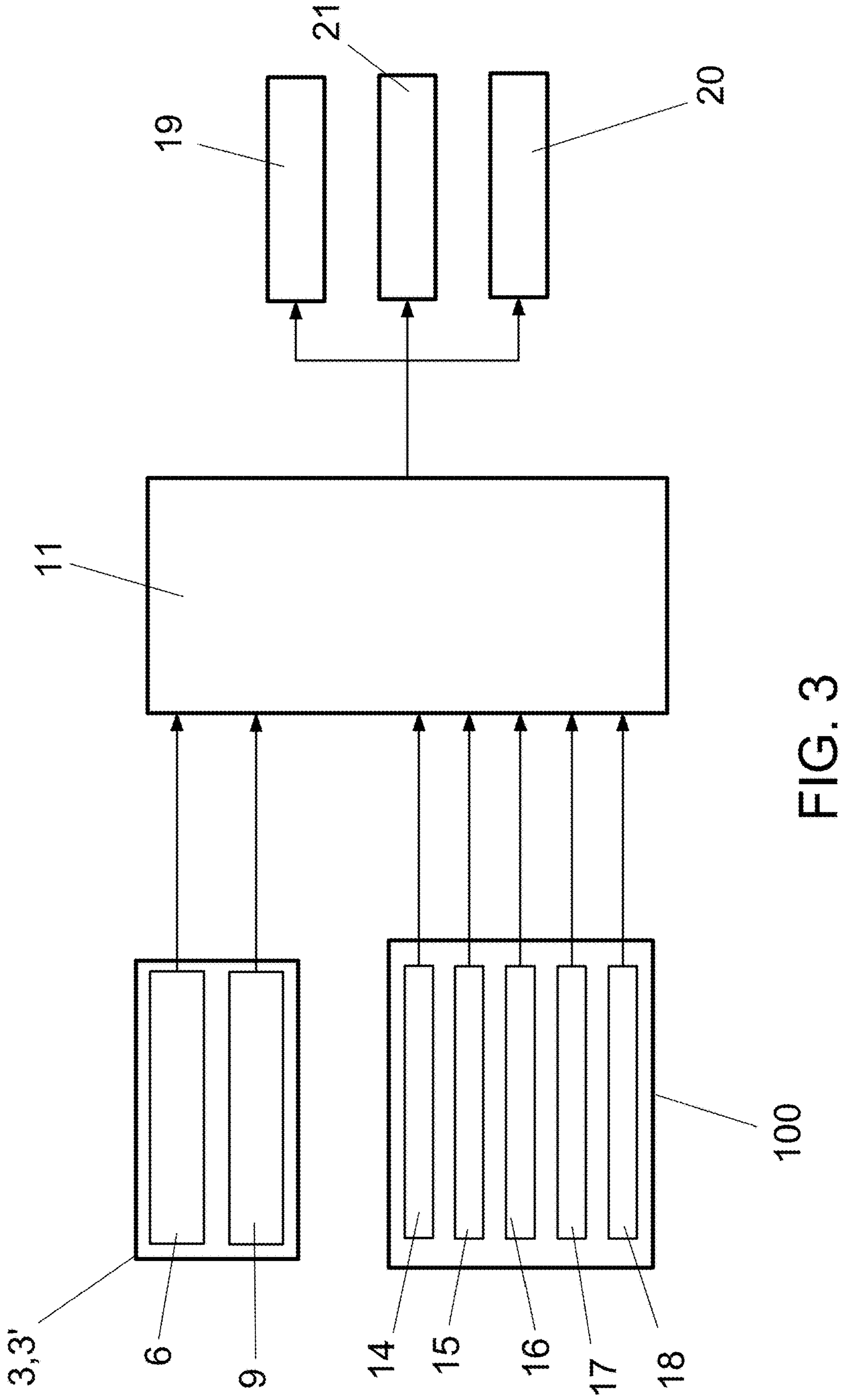
FIG. 3 shows an architecture of a device for estimating braking activation, in accordance with a second embodiment of the invention.

In a second embodiment, depicted schematically in FIG. 3, the electronic control unit 11 acquires the electrical signals generated by the force sensor 6 and temperature sensor 9 and interacts directly with other sensors installed in the vehicle.

Advantageously, the vehicle speed, the vehicle acceleration, the temperature of the environment outside the vehicle, the temperature of the braked element 2, the speed and/or angular acceleration of the vehicle wheel can be used together or alternatively to improve the performance of a calculation algorithm in the control unit 11 for the estimation of the braking activation of a vehicle. Advantageously, the electronic control unit 11 of brake 1 can interact with the electronic control unit 12 of the vehicle, with which the vehicle is normally equipped.

Figure 4:
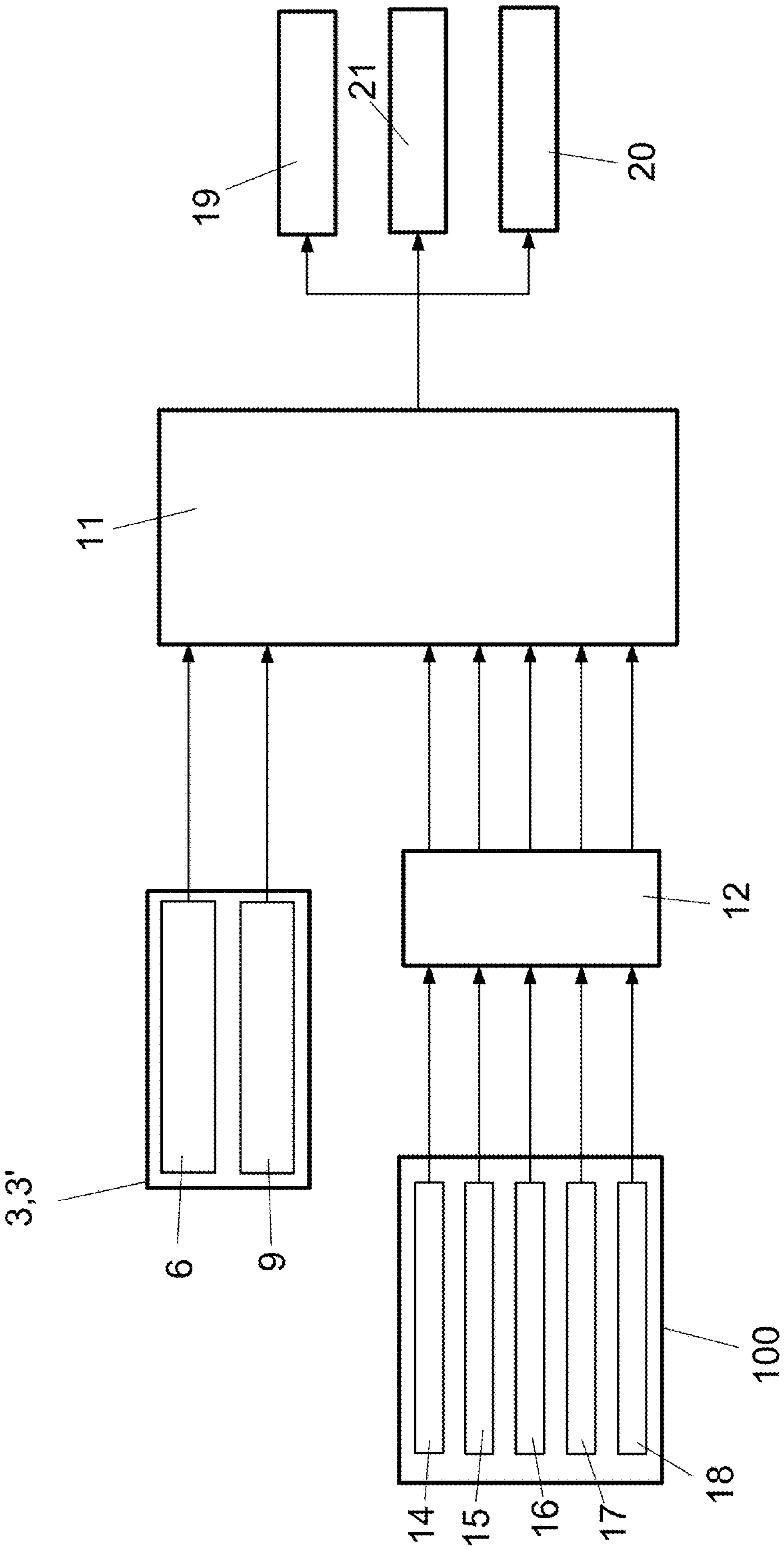
FIG. 4 shows an architecture of a device for estimating braking activation, in accordance with a third embodiment of the invention.

In a third embodiment, schematically depicted in FIG. 4, the electronic control unit 11 acquires the electrical signals generated by the force sensor 6 and temperature sensor 9 and interacts with other sensors installed in the vehicle via the vehicle's electronic control unit 12.

Advantageously, the electronic control unit 12 of the vehicle acquires and compensates with its own algorithms the signals detected by other sensors installed in the vehicle, which it transfers together or alternatively to the control unit 11 to improve the performance of a calculation algorithm for estimating the braking activation of a vehicle.

In a first preferred embodiment of the present invention, the customised algorithm for processing significant temporal changes in the force signal of the control unit 11 employs edge detection techniques with development of pseudo-convolution over discrete times through a statistical type window and a progressive portion of said signal defined by a sliding threshold buffer, wherein the comparison of said processed signal with a variable threshold value evaluated in real time by image processing techniques determines the definition of said temporal moments of braking activation and release.

More specifically, the reference signal H as a function of time H (t) detected by the force sensors 6 is processed by the customised algorithm in the control unit 11: the time-dependent signal convolution techniques involve an integral over continuous time; due to the need to handle discrete sampling and the purposes of the algorithm, a pseudo-convolution is used as a summation over discrete times of the signal detected by a window of fixed size Δ, denoted "$H_{window}$", of statistical type (typically Gaussian/Hamming) and a moving buffer of fixed size Δ over the interval [t^−Δ, t], denoted "Raw_[t^-Δ,t]", where the buffer size is typically between 10 ms and 500 ms, preferably between 50 ms and 400 ms; the buffer size determines the detection capability in the transitory, but while a larger buffer size offers better performance, it also introduces a greater delay in detection.

Analytically, the pseudo-convolution is presented in the formula where at instant $\hat{t}$ the pseudo-convolution $H(\hat{t})$ will be calculated:

$$H(\hat{t}) = \frac{H_{window} \cdot \text{Raw}_{[\hat{t}-\Delta,\hat{t}]}}{\Delta}$$

where Δ is the size of the buffer; and where the use of bold type indicates vector quantities and the product shown in the numerator is to be understood as the scalar product of two vectors. In full, the formula can be written as:

$$H(\hat{t}) = \frac{1}{\Delta}\sum_{i=1}^{\Delta} H_{window}(i)\cdot \text{Raw}_{[\hat{t}-\Delta,\hat{t}]}(i)$$

Figure 5:
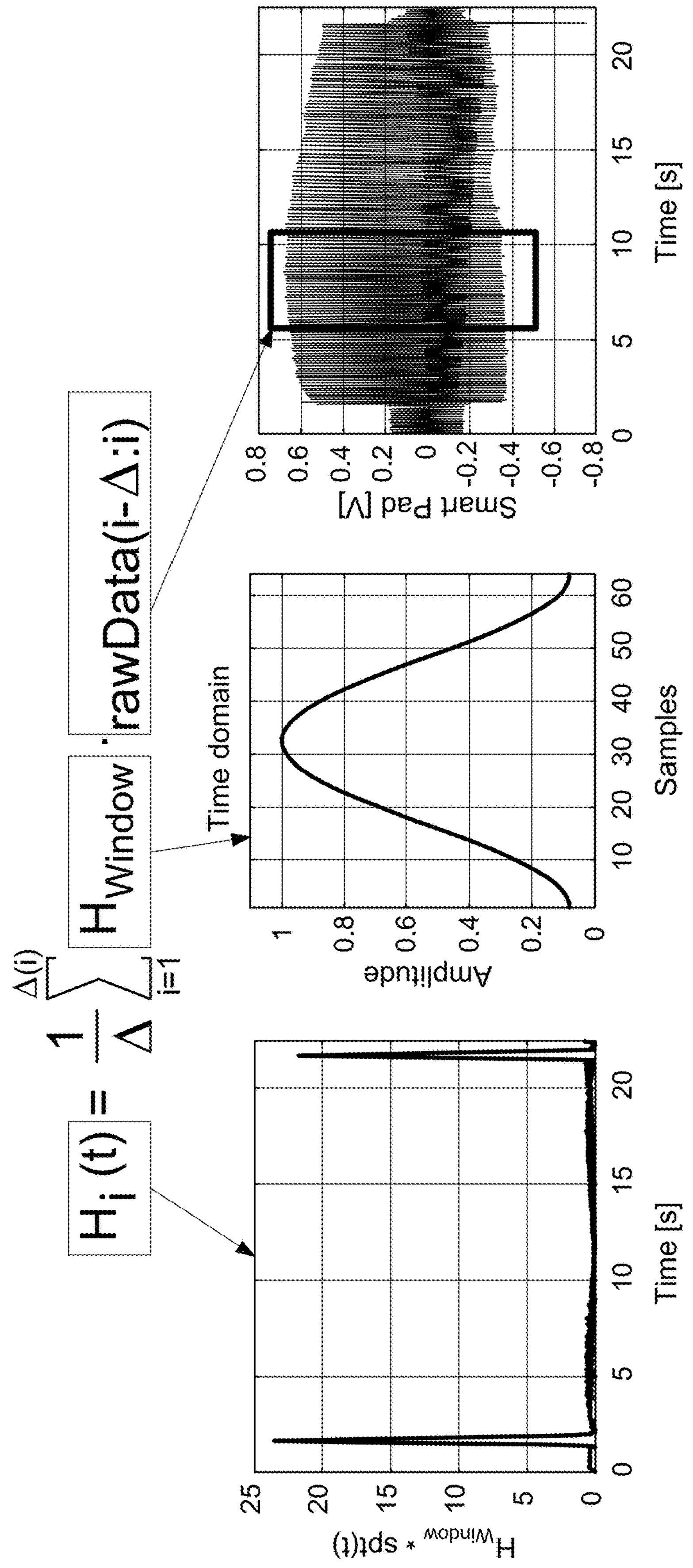
FIG. 5 illustrates the factors of a pseudo-convolution function for determining a signal.

FIG. 5 schematically illustrates the factors of the pseudo-convolution formula.

The variable threshold value evaluated in real time using image processing techniques (typically Niblack and Sauvola): the threshold value is not a fixed numerical level, but is evaluated in real time using signal variations and an average value.

Analytically, the adaptive threshold at instant t^ will be evaluated as follows:

$$Thr(\hat{t}) = \mu(\hat{t})\cdot\left[1+k\cdot\left(\frac{\sigma(\hat{t})}{2}-1\right)\right]$$

$\mu(\hat{t})$e$\sigma(t)$ are mean and standard deviation calculated on $\text{Raw}_{[\hat{t}-\Delta,\ \hat{t}]}$, moving buffer of fixed size Δ defined on the interval $[t-\Delta,\ \hat{t}]$ In particular, $\mu(\hat{t})$e$\sigma(\hat{t})$ are calculated using the following relations:

$$\mu(\hat{t}) = \frac{1}{N}\sum_{i=1}^{N}\text{Raw}_{[\hat{t}-\Delta,\hat{t}]}(i)$$

$$\sigma(\hat{t}) = \frac{1}{N}\sum_{i=1}^{N}\left[Ra_{[\hat{t}-\Delta,\hat{t}]}(i)-\mu(\hat{t})\right]^2$$

Figure 6:
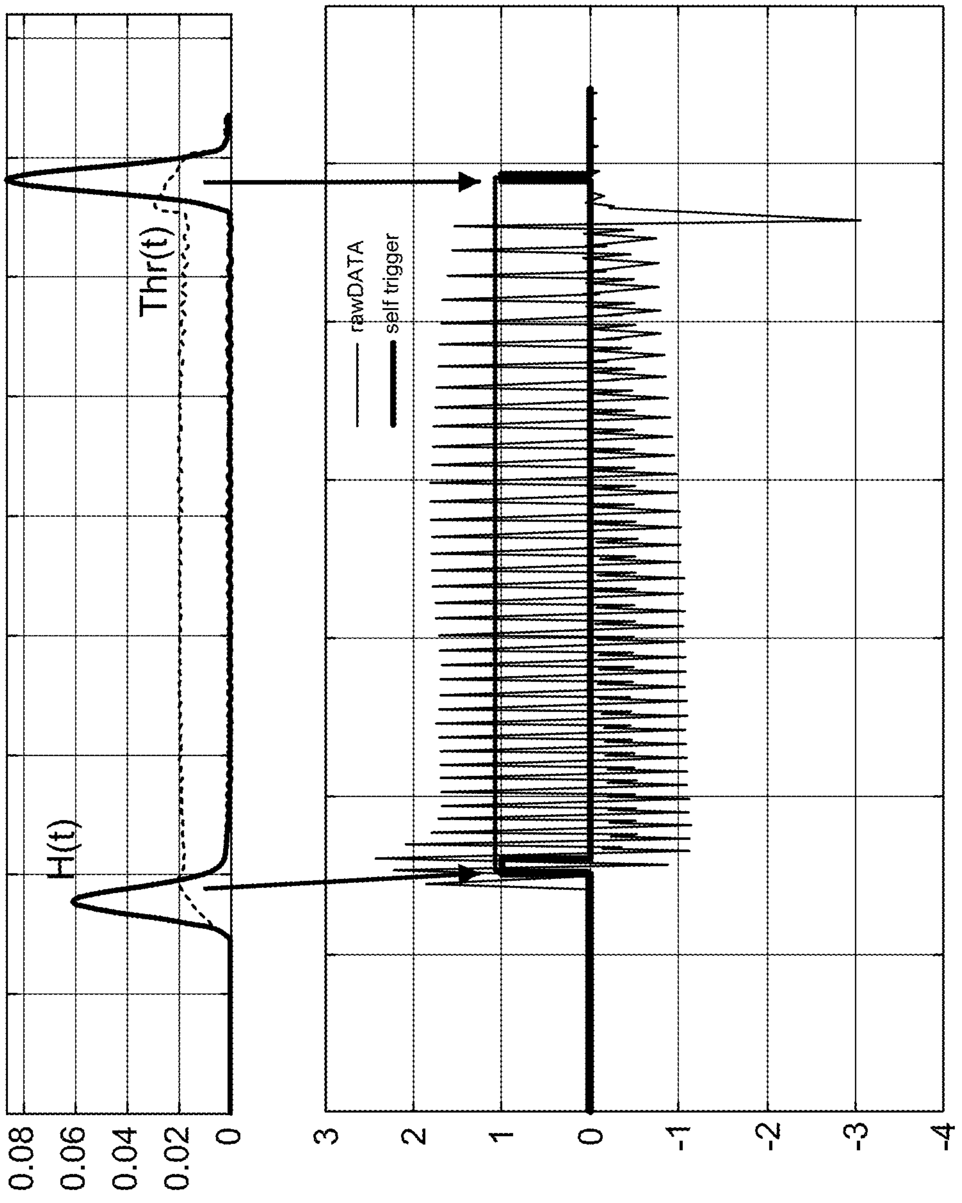
FIG. 6 illustrates the overlap in time between a signal and a threshold value.

In this formulation, k and N are hyper-parameters of the model that must subsequently be optimised using appropriate optimisation techniques;

where the first factor represents the moving average of the raw signal in the buffer of size Δ, and the function σ represents the moving standard deviation of the raw signal in the buffer of size Δ. By comparing the reference signal H (t) with the threshold Thr (t), the braking activation signal is determined; FIG. 6 illustrates the overlap in time between signal H (t) and the threshold value Thr (t).

The braking activation signal is only delayed in time by the size of the buffer.

In a second preferred embodiment of the present invention, the control unit 11 acquires and calibrates at least data from at least one vehicle speed sensor 14 and at least one vehicle acceleration sensor 15, and normal force and/or shear force data from the force sensors 6, compares the significant changes in the force signal acquired from the force sensors 6 with the calibrated data acquired from the acceleration sensor 15 and predefined thresholds and determines the temporal moments of braking activation and release.

Figure 7:
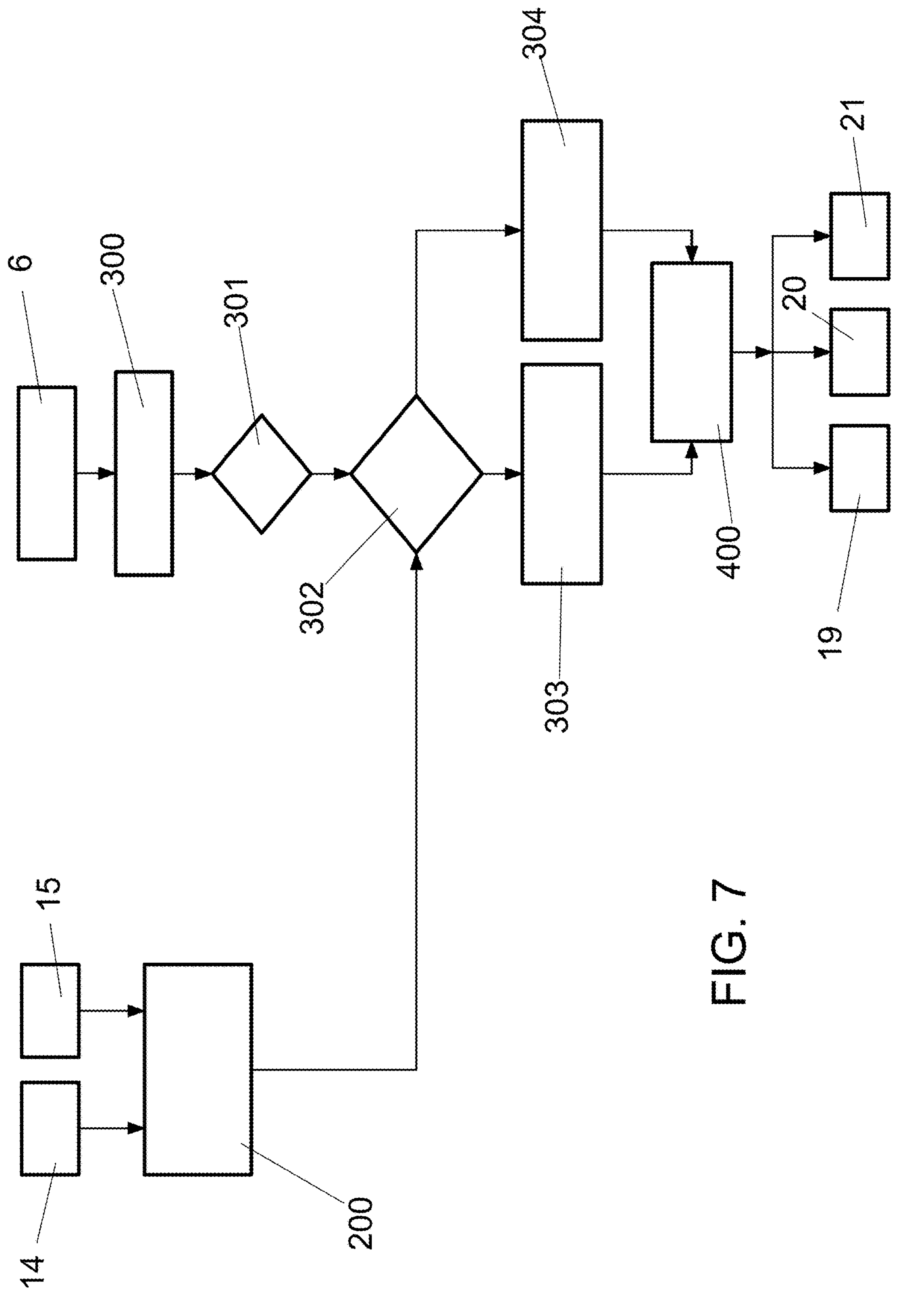
FIG. 7 shows a block diagram of an algorithm for estimating braking activation.

The block diagram of the algorithm is shown in FIG. 7.

At station 200 the customised algorithm of control unit 11 compensates the acceleration values using a sensor tilt technique.

At station 300, the algorithm integrates the signal from force sensor 6 and evaluates its variation, which if positively compared at station 301 with a predetermined threshold value, is compared at station 302 with the compensated acceleration value from station 200.

If both values exceed a predetermined acceleration threshold value, the event is classified by 303 as a braking activation, or a braking modulation.

If the force sensor signal value exceeds the threshold, but the acceleration value does not, the event is classified by 304 as a brake release.

The events thus classified from stations 303 and 304 contribute to the estimated braking activation at station 400.

Figure 8:
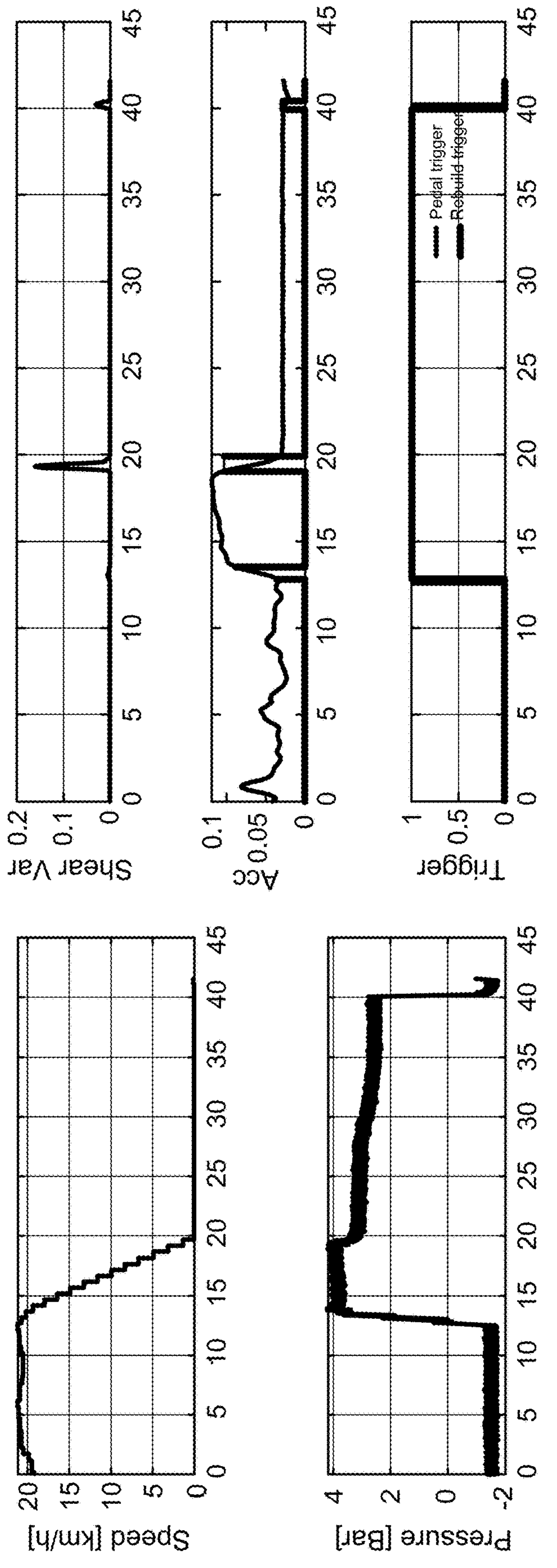
FIG. 8 shows experimental data and a comparison with data processed by the braking activation estimation algorithm.
Figure 9:
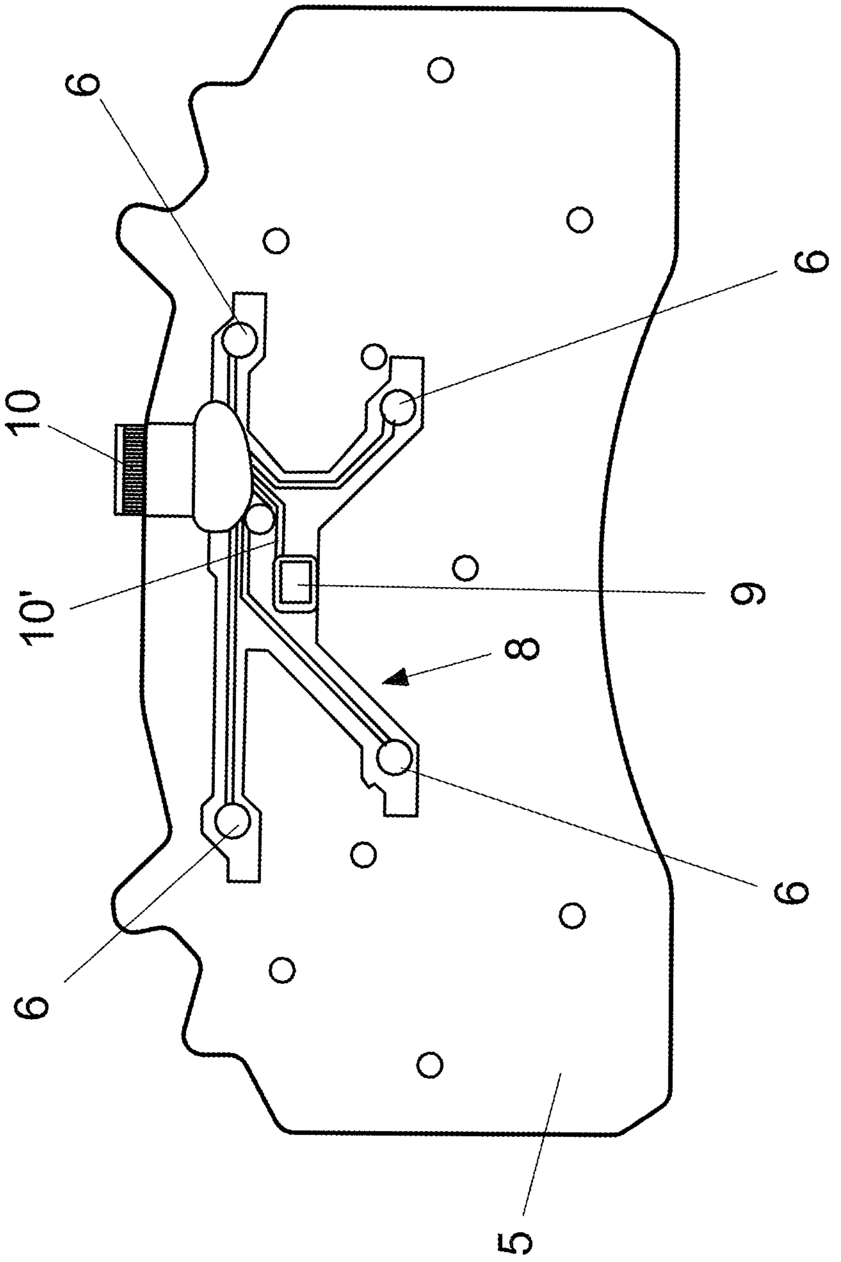
FIG. 9 shows a plan layout of a possible embodiment of a sensorised brake pad which can be used for braking activation estimation, where the block of wear material and the possible shock-absorbing sub-layer have been removed for clarity.

FIG. 8 shows experimental data and a comparison with data processed by the braking activation estimation algorithm, which confirm the positive results of applying the method of the present invention for braking activation estimation.

The present invention also discloses a device for estimating the braking activation of a vehicle comprising at least one braking element 3, 3' and an at least one braked element 2 of at least one brake 1 of a vehicle, wherein the braking element 3, 3' includes at least one sensor of a force 6, and at least one control unit 11, wherein the control unit 11 acquires over time a force signal generated by the at least one force sensor 6, detects significant temporal changes in the force signal; processes with a customised algorithm the significant temporal changes in the force signal; reconstructs through the algorithm the temporal moments of activation and release of the braking; returns said temporal moments of activation and release of the braking to information systems 19 and/or on-board vehicle control applications 20 and/or algorithms 21 dedicated to estimating the performance and condition of the braking system.

In practice, it was found that a method for estimating the activation of a vehicle braking according to the invention is particularly advantageous because it is derived using direct measurements of the normal and/or shear force signals detected by intelligent brake pads, supplemented in some embodiments by other measurements from other on-board vehicle sensors.

Advantageously, according to the present invention, braking activation can be estimated in real time.

Brake activation estimation can advantageously be used to replicate/verify brake pedal activation, i.e. to signal any unwanted changes in brake pedal position and/or inappropriate activation of brake assist systems.

Advantageously, braking activation information can be used for pure monitoring purposes, e.g. for the vehicle information 19 and entertainment system, but also for closed-loop feedback applications, e.g. but not limited to control applications 20 BBW (Brake By Wire) for electric brakes and EMB (Electro Magnetic Brake or Electro Mechanic Brake) for electromagnetic or electromechanical brakes.

Not the least advantage of the present invention is the ability to provide braking activation information to further algorithms 21 dedicated to estimating the performance and condition of the braking system, typically residual torque estimation, ABS intervention, vehicle speed, rotating element temperature, friction element wear estimation, and others, typically developed by the Applicant.

Advantageously, all acquisition and processing algorithms are independent of the type of vehicle and/or brake pad and/or driving style, thanks to a self-assessment of the calibration of the signal threshold: advantageously, no tuning operations are therefore required for different applications.

Modifications and variations to the method and device for estimating the activation of a vehicle brake beyond those described are of course possible.

The method of estimating the braking activation of a brake element of a vehicle designed in this manner is subject to numerous modifications and variations, all falling within the inventive concept as defined in the claims.

In addition, all details can be replaced with other technically equivalent elements.

In practice, the materials used, as well as the systems, can be of any type according to requirements and the state of the art.

The invention claimed is:

1. A method for estimating an activation of a braking of a vehicle, the vehicle comprising at least one braking element and at least one braked element of at least one brake, the at least one braking element including at least one force sensor, and at least one electronic control unit of the at least one brake, the method comprising:

temporally acquiring by the at least one electronic control unit at least one force signal generated by the at least one force sensor;

detecting significant temporal changes of the at least one force signal that meet a threshold;

processing, in the at least one electronic control unit with a customized algorithm, the temporal changes of the at least one force signal;

reconstructing, with the customized algorithm, temporal moments of activation and release of the braking; and returning by the at least one electronic control unit the temporal moments of activation and release of the braking to at least one of a group consisting of information systems, board control applications, and algorithms dedicated to estimating a performance and conditions of a braking system of the vehicle, wherein the customized algorithm uses edge detection techniques with development of pseudo-convolution over discrete times through a window of statistical type and a progressive portion of the at least one force signal defined by a sliding threshold buffer, in which a comparison of the processed temporal changes of the at least one force signal with a variable threshold value evaluated in real time with image process techniques causes the temporal moments of activation and release of the braking to be defined.

2. The method of claim 1, wherein the at least one braking element includes a plurality of force sensors.

3. The method of claim 2, wherein the at least one force signal is acquired as an average of force signals generated by the plurality of force sensors.

4. The method of claim 1, wherein the returning by the at least one electronic control unit the temporal moments of activation and release of the braking to at least one of a group consisting of the information systems, the board control applications, and the algorithms dedicated to estimating the performance and conditions of the braking system of the vehicle occurs in real time.

5. The method of claim 1, further comprising using sensors installed in the vehicle for measuring and/or estimating physical parameters representing a status of the at least one brake and/or the vehicle.

6. The method of claim 5, wherein the sensors comprise at least one sensor from a group consisting of a speed sensor of the vehicle, an acceleration sensor of the vehicle, a temperature sensor of an ambient temperature outside the vehicle, a temperature sensor of the at least one braked element, and an angular speed and/or acceleration sensor of a wheel of the vehicle.

7. The method of claim 1, wherein the at least one electronic control unit is singly dedicated to a corner of the vehicle.

8. The method of claim 1, wherein the at least one electronic control unit is dedicated to a plurality of corners of the vehicle.

9. The method of claim 1, wherein the sliding threshold buffer has a size comprised between 10 ms and 500 ms.

10. The method of claim 6, wherein the at least one electronic control unit acquires and calibrates at least data from the speed sensor of the vehicle and the acceleration sensor of the vehicle and normal force data and/or shear force data from the at least one force sensor, and wherein the customized algorithm compares the temporal changes of the at least one force signal with the calibrated data of the acceleration sensor and predefined thresholds and determines the temporal moments of activation and release of the braking.

11. The method of claim 9 wherein the sliding threshold buffer has a size comprised between 50 ms and 400 ms.

12. A device for estimating an activation of a braking of a vehicle, the device comprising:

at least one braking element and at least one braked element of at least one brake of the vehicle in which, the at least one braking element comprising at least one force sensor; and at least one electronic control unit configured to: acquire over time a force signal generated by the at least one force sensor; detect temporal changes of the force signal that meet a threshold process with a customized algorithm the temporal changes of the force signal;

reconstruct, with the customized algorithm, temporal moments of activation and release of the braking; and return the temporal moments of activation and release of the braking to at least one of a group consisting of information systems, on-board control applications, algorithms dedicated to estimating a performance and conditions of a braking system of the vehicle, wherein the customized algorithm uses edge detection techniques with development of pseudo-convolution over discrete times through a window of statistical type and a progressive portion of the force signal defined by a sliding threshold buffer, in which a comparison of the processed temporal changes of the at least one force signal with a variable threshold value evaluated in real time with image process techniques causes the temporal moments of activation and release of the braking to be defined.

13. The device of claim 12, wherein the device further comprises sensors comprising means for measuring and/or estimating physical parameters representing a status of the at least one brake and/or of the vehicle.

14. The device of claim 12, wherein the device further comprises sensors comprising at least one sensor selected from a group consisting of a speed sensor of the vehicle, an acceleration sensor of the vehicle, a sensor of ambient temperature outside the vehicle, a temperature sensor of the at least one braked element, and an angular speed and/or acceleration sensor of a wheel of the vehicle.

15. A method for estimating an activation of a braking of a vehicle, the vehicle comprising at least one braking element and at least one braked element of at least one brake, the at least one braking element including at least one force sensor, and at least one electronic control unit of the at least one brake, the method comprising:

temporally acquiring by the at least one electronic control unit at least one force signal generated by the at least one force sensor;

detecting temporal changes of the at least one force signal that meet a threshold;

processing in the at least one electronic control unit, with a customized algorithm, the temporal changes of the at least one force signal;

reconstructing, with the customized algorithm, temporal moments of activation and release of the braking; and returning by the at least one electronic control unit the temporal moments of activation and release of the braking to at least one of a group consisting of information systems, board control applications, and algorithms dedicated to estimating a performance and conditions of a braking system of the vehicle, wherein the method further comprises using sensors installed in the vehicle for measuring and/or estimating physical parameters representing a status of the at least one brake and/or the vehicle, wherein the sensors comprise at least one sensor from a group consisting of a speed sensor of the vehicle, an acceleration sensor of the vehicle, a temperature sensor of an ambient temperature outside the vehicle, a temperature sensor of the at least one braked element, and an angular speed and/or acceleration sensor of a wheel of the vehicle, and wherein the at least one electronic control unit acquires and calibrates at least data from the speed sensor of the vehicle and the acceleration sensor of the vehicle and normal force data and/or shear force data from the at least one force sensor, and wherein the customized algorithm compares the temporal changes of the at least one force signal with the calibrated data of the acceleration sensor and predefined thresholds and determines the temporal moments of activation and release of the braking.

16. A device for estimating an activation of a braking of a vehicle, the device comprising, at least one braking element and at least one braked element of at least one brake, the at least one braking element comprising at least one force sensor; and at least one electronic control unit configured to: acquire over time a force signal generated by the at least one force sensor; detect temporal changes of the force signal that meet a threshold; process, with a customized algorithm, the temporal changes of the force signal; reconstruct, with the customized algorithm, temporal moments of activation and release of the braking; and return the temporal moments of activation and release of the braking to at least one of a group consisting of information systems, on-board control applications, algorithms dedicated to estimating a performance and conditions of a braking system of the vehicle, wherein the device further comprises sensors installed in the vehicle comprising means for measuring and/or estimating physical parameters representing a status of the at least one brake and/or the vehicle, wherein the sensors comprise at least one sensor from a group consisting of a speed sensor of the vehicle, an acceleration sensor of the vehicle, a temperature sensor of an ambient temperature outside the vehicle, a temperature sensor of the at least one braked element, and an angular speed and/or acceleration sensor of a wheel of the vehicle, and wherein the at least one electronic control unit acquires and calibrates at least data from the speed sensor of the vehicle and the acceleration sensor of the vehicle and normal force data and/or shear force data from the at least one force sensor, and wherein the customized algorithm compares the temporal changes of the force signal with the calibrated data of the acceleration sensor and predefined thresholds and determines the temporal moments of activation and release of the braking.

* * * * *